Nov. 21, 1950     C. E. BURKEY     2,531,107
BUMPER ATTACHMENT CLAMP FOR CAR-TOP CARRIERS
Filed Aug. 31, 1948     2 Sheets-Sheet 1
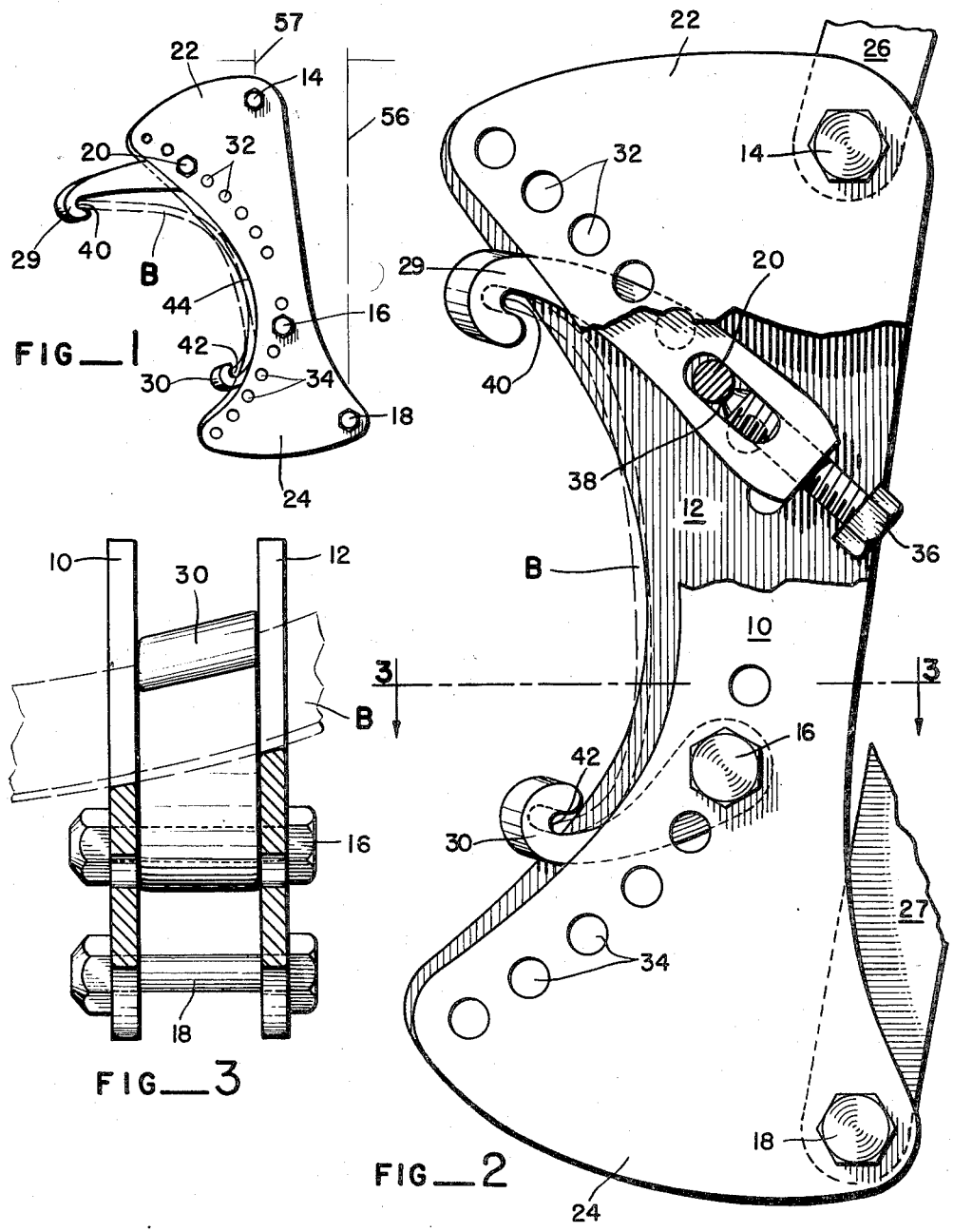
CARL E. BURKEY
Inventor
By Smith & Tuck
Attorney Nov. 21, 1950     C. E. BURKEY     2,531,107
BUMPER ATTACHMENT CLAMP FOR CAR-TOP CARRIERS
Filed Aug. 31, 1948     2 Sheets-Sheet 2
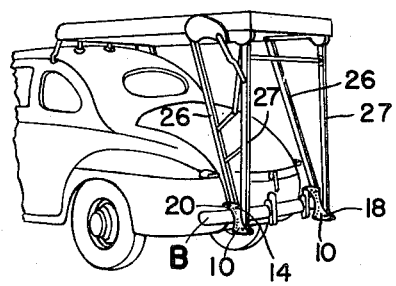
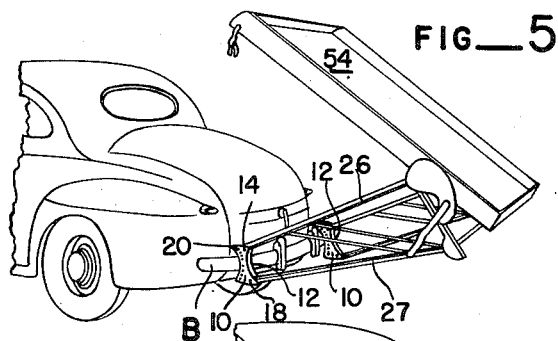
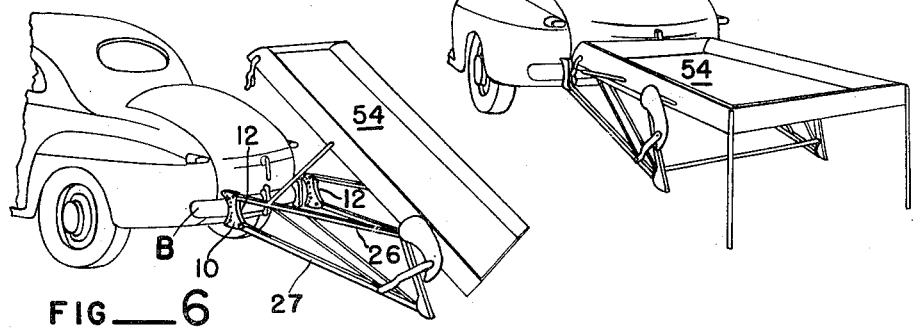
CARL E. BURKEY
Inventor
By Smith + Tuck
Attorneys Patented Nov. 21, 1950

2,531,107

UNITED STATES PATENT OFFICE 2,531,107

BUMPER ATTACHMENT CLAMP FOR CAR-TOP CARRIERS

Carl E. Burkey, Seattle, Wash.

Application August 31, 1948, Serial No. 46,940

2 Claims. (Cl. 24—263)

My present invention relates to the general class of devices which are used to attach trailers and carriers to the bumpers of automobiles. More particularly, my device is intended as a bumper attachment clamp for car-top carriers.

The more general use of carriers for carrying baggage, skis and boats on the roof of cars has made it very desirable to have a bumper clamp which can be adapted to the wide variety of bumpers with which present day automobiles are provided. While most automobiles have transversely disposed bar bumpers, these bars are, for the most part, curved throughout their length and then in vertical section are formed of relatively light material in an arcuate form so as, on one hand, to increase their resistance to damage by the strengthening action of the form and, secondly, to cause the bumpers to blend into the general stream-lining that is so much affected in present day automobiles. There are at present a number of car-top carriers which are arranged to be loaded while in the lowered position, and then raised to their carrying position on the top of the car. Typical of this type is my co-pending application Serial No. 743,809, now Patent No. 2,479,035.

The use of bumper clamp means with such carriers brings into being a further consideration, namely, that the positioning of the two pivoted supporting members for the carrier, one pair being disposed on each side of the car, requires that the fore-and-aft positioning of these two pivots with respect to each other must be accurately maintained if the carrier is to function as intended; and still the requirement must be met that the clamp can be securely attached to the wide variety of bumpers observed. With my present invention, it is believed that I have provided a bumper attachment or clamp which fills these various conditions.

The principal object of my present invention, therefore, is to provide a bumper clamp or attachment which can be attached to an automobile bumper and which will accurately position the clamp so that it will co-act properly with the device it is required to support.

A further object of my invention is to provide means whereby a clamp-on attachment for bumpers can be so arranged that a wide range of bumper forms can be successfully accommodated.

A further object of my invention is the provision of means whereby adequate adjustment is had for the upper and lower bumper engaging members so that the clamp-on attachment may be positioned as desired.

A further object of my invention is to provide a clamp-on attachment for automobile bumpers which can be properly positioned even though the car bumper has a definite bend along its longitudinal axis.

Further objects, advantages and capabilities will be apparent from the description and disclosure in the drawings or may be comprehended or are inherent in the device.

In the drawings:

Fig. 1 is a vertical, elevational view showing the side of one of my clamp-on bumper attachments with the bumper, to which it is attached, shown in dashed lines.

Fig. 2 is an enlarged elevational view taken in the same general sense as Fig. 1 but with certain parts broken away so that the interior construction can be more clearly understood.

Fig. 3 is a horizontal sectional view taken along the line 3—3 of Fig. 2.

Figs. 4, 5, 6 and 7 show the range of movement of one form of car-top carrier with which my device has proven successful in use.

Referring more particularly to the disclosure in the drawings, my clamp-on attachment consists of two similar plates as 10 and 12, which are spaced apart either by actual spacers or by other components of the clamp and are held in aligned position by a plurality of through bolts as 14, 16, 18, and 20.

The general form of plates 10 and 12 may be compared to an hour-glass form, in that the upper portion 22 and the lower portion 24 are extended transversely, so as to provide an extreme rearward position for bolts 14 and 18 which, in turn, support the pivoted arms 26 and 27 of a car top carrier, and on the side opposite from bolts 14 and 18, the two ends of plates 10 and 12 are extended forwardly or to the left, as viewed in Figs. 1 and 2, so as to provide for the forward and rearward adjustment of the bumper engaging hooks 29 and 30. To accomplish the positioning of these hooks, I have provided a plurality of holes which are in aligned pairs in plates 10 and 12 and which are designated in the upper portion of the plate as holes 32 and in the lower portion as holes 34. The purpose of the large number of positioning holes 32 and 34 is to permit the positioning of hook members 29 and 30 in a wide range of positions, so that they can successfully engage bumpers having a wide range of cross-sectional shapes. It is to be noted that in Fig. 1 I have shown one form of bumper where an extreme forward overhang is provided. This is common on many of the streamlined cars. The more common form of bumper is shown in dashed lines in Fig. 2, and it will be observed that the full range of adjustment has not been called for even with the wide variation in the design of these two bumpers.

In normal use, it has been found practical to form lower hook member 30 with a round hole in its inner end, with bolt 16 passing through it and through plates 10 and 12 so as to position the same, but still permitting it to swing upwardly or downwardly as the case requires. In the case of the upper hook member 29, however, the need has been found for a hook member that could be pivoted about its securing bolt 20 but, at the same time, have considerable adjustment, so that as the clamp is clamped onto a bumper the lower hook member 30 can be engaged under the lower lip of the bumper, the upper hook 29 can be engaged over the upper margin of the bumper and then, by adjusting or tensioning bolt 36, hook 29 can be tightened on the bumper so that normally a three-point contact is obtained, one point at each of hook members 29 and 30 and a third where the bumper B rests upon the two side plates 10 and 12. This adjustment is made possible by virtue of the elongated hole or slot 38 which encloses bolt 20 and still permits adequate longitudinal adjustment thereof to enable a clamping action to be obtained through the adjustment of bolt 36. It will be observed that where the bumper B tends to meet side plates 10 and 12, I have found it desirable to relieve these side plates so as to form an inwardly disposed or concave curve for the leading edge of plates 10 and 12, substantially after the showing of Figs. 1 and 2.

For attachment to many forms of bumpers having a small degree of transverse curvature, curvature along the major axis of the bumper can be accomplished by the normal give of the side plates 10 and 12 with respect to each other. There are certain bumpers, however, that have an extreme bend, particularly at their ends, where attachment must be made and under such conditions, it is desirable that the bight of the hooks, as 40 and 42, should be dressed out angularly with the general plane of the hook members or the plane of plates 10 and 12, so that they can properly engage the curved portion of the bumper as have been shown in dashed lines in Fig. 3. Further, in extreme cases, it is sometimes desirable to dress out the concaved portion 44 of side plates 10 and 12, so as to form a more snug engagement for both of the side plates.

Reference is now made to Figs. 4, 5, 6 and 7, which illustrate one form of car-top carrier with which my clamp-on attachments are most useful. In this form of device, however, it is to be noted that pairs of side, load-carrying members as 26 and 27, control the positioning of the carrier 54 box or frame proper to make it possible for the carrier to be horizontal as viewed in Fig. 4, or in the inclined positions as shown in Figs. 5 and 6, or in the extreme position which is possible with some of the modified forms of car-top carriers, as the horizontal position shown in Fig. 7. The workability of such arrangements devolves about the accurate positioning of bolts 14 and 18. Now, the actual distance between bolts 14 and 18 is fixed for any one installation by plates 10 and 12. However, workability from the standpoint of the operations illustrated in Figs. 4 through 7, inclusive, depend upon the fore-and-aft displacement of bolts 14 and 18. In Fig. 1, I have illustrated this displacement by dashed lines as 56 and 57. If, for instance, it is necessary that this displacement, for proper workability of the carrier, should be 2 inches then it is essential that the vertical angular position of side plates 10 and 12 be such as to maintain this displacement, and it is under such conditions that it is essential to have a wide range of adjustment, so that hook members 29 and 30 may have their pivots shifted throughout the range necessary to enable the clamping of my attachment to bumpers of various shapes and still maintain this fore-and-aft displacement. It is believed that a perusal of Figs. 1, 2, and 3 will indicate how I have achieved this end result with my present attachment.

In using my clamp-on attachment, the carrier box is placed on top of the car, as in Fig. 4, and the pairs of supporting bars 26 and 27 are swung into usable position by moving plates 10 and 12 into contact with the bumper B. Bolts 16 and 20 are removed and hooks 29 and 30 are tentatively placed in position, in engagement with bumper B. Bolts 16 and 20 are then passed through the appropriate holes 32 and 34, respectively, including the holes in hooks 29 and 30. Bolt or set screw 36, which should have been backed entirely out of slot 38, is now screwed in until engagement is secured with bolt 20. If bolts 14 and 18 now appear to be properly positioned, screw 36 is tightened, thus firmly seating hooks 29 and 30 securely on bumper B. If arms 26 and 27 are not capable of their full swings, a new combination of holes 32 and 34 must be selected.

It is believed that it will be clearly apparent from the above description and the disclosure in the drawings, that the invention comprehends a novel construction of a bumper attachment clamp for car top carriers.

Having thus described my invention, I claim:

1. A clamp-on attachment for automobile bumpers, consisting of: spaced similar side plates disposed in parallel relationship, said plates formed of modified hour-glass section having concave forward edges; a plurality of upper positioning holes disposed substantially in a line downwardly and rearwardly directed; a plurality of lower positioning holes disposed substantially in a line directed upwardly and rearwardly; an upper attachment hole and a lower attachment hole disposed near the rear edges of said plates; all of said attachment and positioning holes occurring similarly positioned in each of said spaced plates; a lower hook clamping member having a hook on one end and a bolt hole on the opposite end; a bolt for said lower clamp member adapted to pass through successively one side plate, the clamp member and the opposite side plate; an upper clamp member having a hook at one end and an elongated hole near the opposite end thereof adapted to receive a positioning bolt; a bolt for said upper clamp member adapted to pass through successively one side plate, the clamping member and the opposite side plate; and a tensioning bolt adapted to pass through the end of said clamp member substantially parallel to its longitudinal axis and into the elongated hole adapted to serve as a clamping means for said clamp member.

2. A clamp-on attachment for automobile bumpers, consisting of: spaced similar side plates disposed in parallel relationship, said plates having concave forward edges and a plurality of upper positioning holes and a plurality of lower positioning holes disposed substantially parallel to said concave forward edges; an upper attachment hole and a lower attachment hole disposed near the rear edge of said plate; all of said attachment and positioning holes occurring similarly positioned in each of said spaced plates; a lower hook clamping member having a hook on one end and a bolt hole on the opposite end; a bolt for said lower clamp member adapted to pass through successively one side plate, the clamp member and the opposite side plate; an upper clamp member having a hook at one end and a hole near the opposite end thereof adapted to receive a positioning bolt; a bolt for said upper clamp member adapted to pass through successively one side plate, the clamping member and the opposite side plate; the hole in one of said clamp members being elongated longitudinally; and a tensioning bolt adapted to pass through the end of one of said clamp members substantially parallel to its longitudinal axis and into the elongated hole adapted to serve as a clamping means for said clamp member.

CARL E. BURKEY.

REFERENCES CITED

The following references are of record in the file of this patent:

UNITED STATES PATENTS

| Number | Name | Date |
| --- | --- | --- |
| 451,090 | Walter | Apr. 28, 1891 |
| 868,945 | Sewal | Oct. 22, 1907 |
| 911,684 | Schields et al. | Feb. 9, 1909 |
| 2,347,081 | Caton | Apr. 18, 1944 |